United States Patent [19]
Sasaki

[11] Patent Number: 5,566,145
[45] Date of Patent: Oct. 15, 1996

[54] HEAD TRACKING SYSTEM IN A DISK DRIVE

[75] Inventor: Takeshi Sasaki, Tokyo, Japan

[73] Assignee: NEC Corporation, Japan

[21] Appl. No.: 571,590

[22] Filed: Dec. 13, 1995

[30] Foreign Application Priority Data

Dec. 15, 1994 [JP] Japan .................................. 6-311525

[51] Int. Cl.$^6$ .................................................. G11B 17/22
[52] U.S. Cl. ............................ 369/32; 369/44.28; 369/43
[58] Field of Search .................................. 369/32, 44.28, 369/44.27, 44.29, 44.32, 44.35, 44.25; 360/78.04, 78.05, 78.06, 78.07, 78.12

[56] References Cited

U.S. PATENT DOCUMENTS

| | | | |
|---|---|---|---|
| 4,615,023 | 9/1986 | Inada et al. | 369/32 |
| 4,855,982 | 8/1989 | Orlicki et al. | 369/32 |
| 4,866,687 | 9/1989 | Kasai et al. | 369/32 |
| 5,255,253 | 10/1993 | Kagami et al. | 369/32 |
| 5,339,299 | 8/1994 | Kagami et al. | 369/32 |
| 5,402,402 | 3/1995 | Kagami et al. | 369/32 |

FOREIGN PATENT DOCUMENTS

61-177641  8/1986  Japan .

Primary Examiner—Georgia Y. Epps
Assistant Examiner—Tan Dinh
Attorney, Agent, or Firm—Hayes, Soloway, Hennessey, Grossman & Hage, P.C.

[57] ABSTRACT

A head tracking system includes an optical head mounting thereon a focusing lens for generating an optical spot on a disk file. The system retrieves a normalized speed profile including a first section for acceleration and a second section for deceleration based on a seeking stroke. The focusing lens is first moved based on the corrected speed profile, which is obtained by multiplying the deceleration in the normalized speed profile by a correction factor. The optical head is then moved in a feed-back loop so that the lens position error becomes zero which is deviation of the focusing lens relative to a reference position of the optical head. The correction factor is calculated by a maximum lens position error obtained during a previous seeking operation. A high-speed, stable and accurate seeking operation can be obtained even in the case of inclination of the optical head, vibration of the focusing lens or fluctuation of the supply voltage.

9 Claims, 6 Drawing Sheets

HEAD TRACKING SYSTEM IN A DISK DRIVE

BACKGROUND OF THE INVENTION

1. Field of the Invention

The present invention relates to a head tracking system in a disk drive and, more particularly, to a head tracking system for an optical head having a focusing lens irradiating an optical spot to a disk file.

2. Description of the Related Art

An optical disk drive system is proposed which has two stages of actuators for positioning of an optical spot, including a first actuator or lens actuator for driving a focusing lens relative to an optical head and a second actuator or a voice coil motor for driving the optical head relative to the optical disk file, both in a radial direction of the optical disk file. The optical disk drive system of this type is described in, for example, Patent Publication No. JP-A-61(1986)-177641. The tracking system described in the publication provides a high-speed seeking as well as an accurate positioning of the optical spot.

The head tracking system in the optical disk drive system as mentioned above carries the optical spot to a target track indicated by the disk drive system while controlling the radial speed of the focusing lens to follow a normalized speed profile during seeking period of the optical spot. An example of the normalized speed profile includes a first profile section in which the speed of the optical spot is increased with a constant acceleration and a second profile section in which the speed of the optical spot is decreased with a constant deceleration.

During the seeking operation, the head tracking system controls the lens actuator to move the focusing lens in accordance with the normalized speed profile and detects a position error of the focusing lens relative to the reference position of the optical head in the radial direction of the optical disk. The head tracking system then drives the voice coil motor and controls the lens actuator so that the position error of the focusing lens relative to the reference position becomes zero.

The normalized speed profile should be determined based on the seek stroke between the target track and the present track before seeking and the maximum output of the voice coil motor to provide a sufficient margin of the lens speed even in the case of inclination of the optical head, vibration of the focusing lens and fluctuation of the supply voltage.

SUMMARY OF THE INVENTION

It is an object of the present invention to provide a head tracking system ill which a higher seek speed is obtained to provide a reduced seek time while maintaining an accurate positioning of the optical head for different strokes of seeking.

A head tracking system for an optical disk drive according to the present invention comprises: an optical head mounting thereon a focusing lens for generating an optical spot on an optical disk; a lens position error sensor for detecting a lens position error representing deviation of the focusing lens with respect to a reference position of the optical head; a first means for generating a normalized speed profile based on a seeking stroke of the optical spot; a second means for calculating a correction factor based on the magnitude of the lens position error during a first seeking operation; a third means for correcting the normalized speed profile based on the correction factor obtained during the first seeking operation to generate a corrected speed profile for a second seeking operation following the first seeking operation; a first actuator for moving the focusing lens relative to the optical head in a radial direction of the optical disk based on the corrected speed profile; and a second actuator for moving the optical head relative to the optical disk in the radial direction based on the lens position error.

In accordance with the present invention, a head tracking system is provided in which a reduced seek time and an optimal seek speed are obtained while maintaining an accurate positioning of the optical head for different strokes of seeking.

BRIEF DESCRIPTION OF THE DRAWINGS

Other and further objects, features and advantages of the present invention will be more apparent from the following description, referring to the accompanying drawings in which.

DESCRIPTION OF THE PREFERRED EMBODIMENTS

Figure 1:
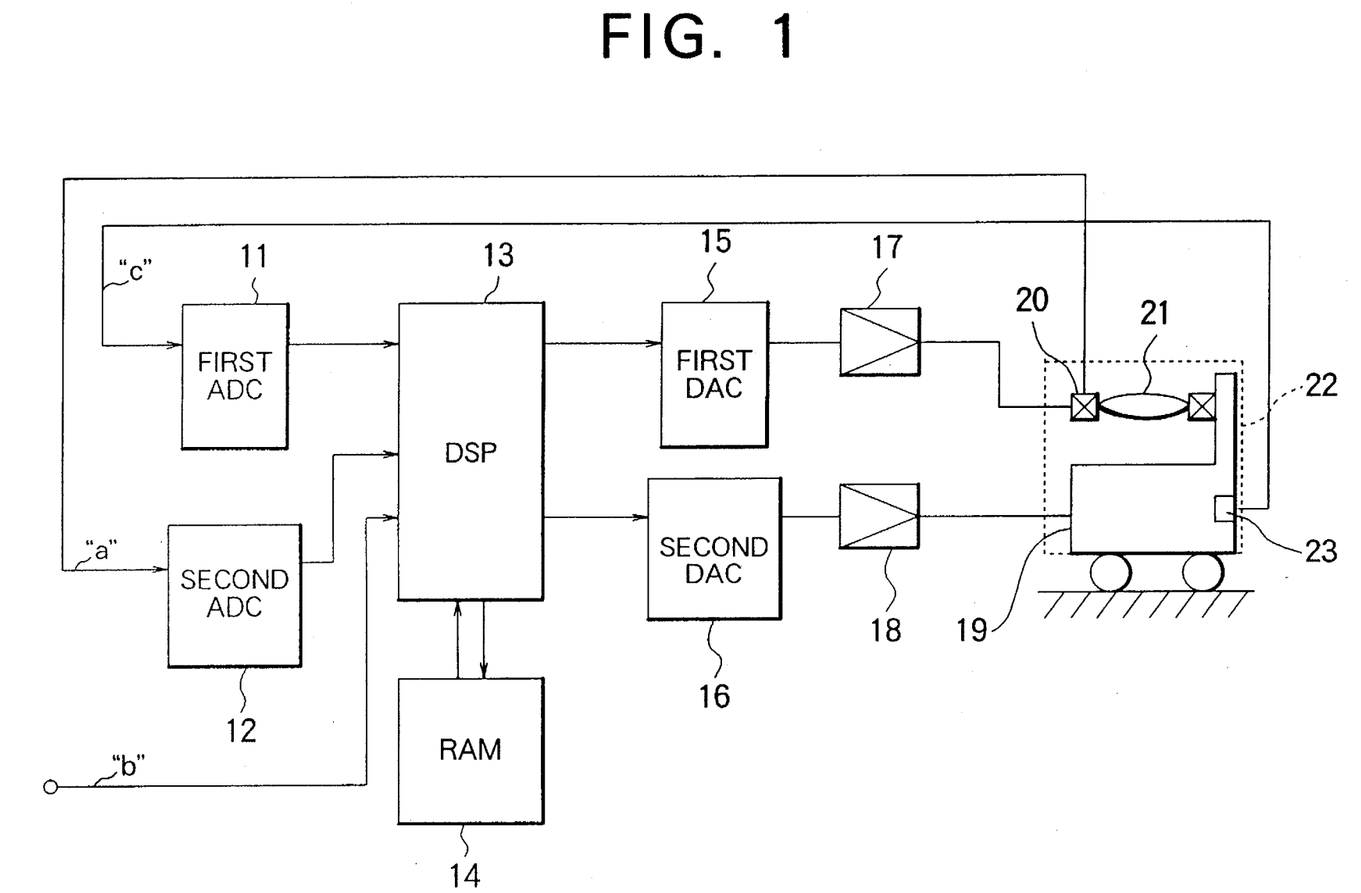
FIG. 1 is a block diagram of a head tracking system according to an embodiment of the present invention.

Referring to FIG. 1, a head tracking system for a disk drive according to an embodiment of the present invention includes a first analog-to-digital converter (ADC) 11, a second ADC 12, a digital signal processor (DSP) 13, a random access memory (RAM) 14, a first digital-to-analog converter (DAC) 15, a second DAC 16, a first power amplifier 17, a second power amplifier 18, a voice coil motor 19 and an optical head 22.

The optical head 22 mounts thereon a lens actuator 20, a focusing lens 21 driven by the lens actuator 20, a lens position sensor 23 for generating a lens position error signal "c" based on the deviation of the focusing lens 21 in a radial direction of the optical disk file with respect to the reference position of the optical head 22, all optical system (not shown) including a light source for irradiating an optical spot through the focusing lens 21, and a photodetector (not shown) for detecting a reflected light from the optical disk file.

The output "c" of the lens position sensor 23, which is called lens position error signal, is supplied to the DSP 13 through the first ADC 11 while a current signal "a" of the current flowing to the lens actuator 20 is supplied to the DSP 13 through the second ADC 12. The first and second power amplifiers 17 and 18 drive the lens actuator 20 and drive motor 19, respectively, based on the respective outputs of the first and second DACs 15 and 16.

Figure 2:
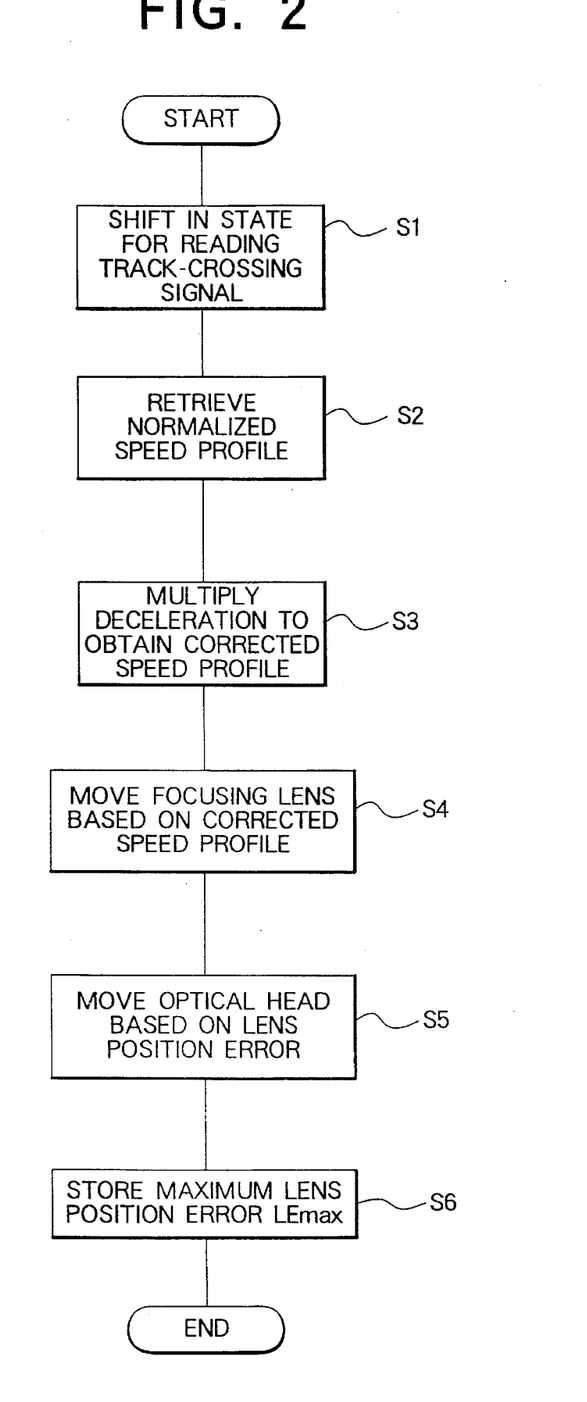
FIG. 2 is a flowchart showing a process for a speed control of the optical spot.

Referring to a flowchart of FIG. 2, there is shown a process executed by the DSP 13. In order to move the optical spot, which is positioned on a present track of an optical disk file, to a target track, which is specified by the disk drive system, a stroke data is first supplied to the DSP 13 from outside the tracking system to start the head tracking system. The stroke data represents the distance between the present track and the target track.

The DSP 13 starts for processing the speed control for the optical spot, and first shifts itself into the state for reading a track-crossing signal "b" for counting the number of tracks crossed by the optical spot (step S1), so as to obtain a present speed of the optical spot. Subsequently, the DSP 13 looks-up a speed profile table stored in the RAM 4 which lists normalized speed profiles in association with the respective stroke data. The DSP 13 retrieves one of the normalized speed profiles based on the stroke data (step S2). The lower the stroke for the seeking, the smaller is the normalized speed in the speed profile. The normalized speed profile includes a first profile section for a constant acceleration and a second profile section for a constant deceleration.

Subsequently, the DSP 13 multiplies the deceleration in the second profile section of the normalized speed profile by a correction factor K, which will be detailed later, to obtain a corrected speed profile, then stores the same in the memory (step S3). Thereafter, the DSP 13 drives the focusing lens through the lens actuator 23 relative to the optical head 22 by using a feed-back control based on the difference between the corrected speed profile and the present speed (step S4). The lens position error signal, which is zero before the driving of the focusing lens, becomes high immediately after the driving.

The DSP 13 then controls the voice coil motor 19 to drive the optical head to follow the focusing lens, which is decelerated in accordance with the acceleration of the optical head 22 to maintain the corrected speed profile of the focusing lens 21 relative to the disk file, by using a feed-back control so that the lens position error signal is reduced to zero (step S5). The DSP 13 obtains the maximum amount of the lens position error during each seeking operation to update the maximum lens position error stored in the memory during the previous seeking operation (step S6) to end the process.

During these operations, the focusing lens moves in accordance with the corrected normalized speed profile while the optical head follows the focusing lens, with the lens position error being left therebetween for some periods.

In step S3, the correction factor K is determined based on the maximum amount of the lens position error during the previous seeking operation. The amount of the lens position error is generally large after the start of the seeking operation and after the time instant between the acceleration period and the deceleration period of the optical spot. It is because the mass of the focusing lens 21 is small as compared to that of the optical head 22.

Now, correction factor K for the normalized speed profile will be described with reference to FIGS. 3 through 5 which show first through third examples, respectively, of the process for obtaining correction factors for the normalized speed profile.

Figure 3:
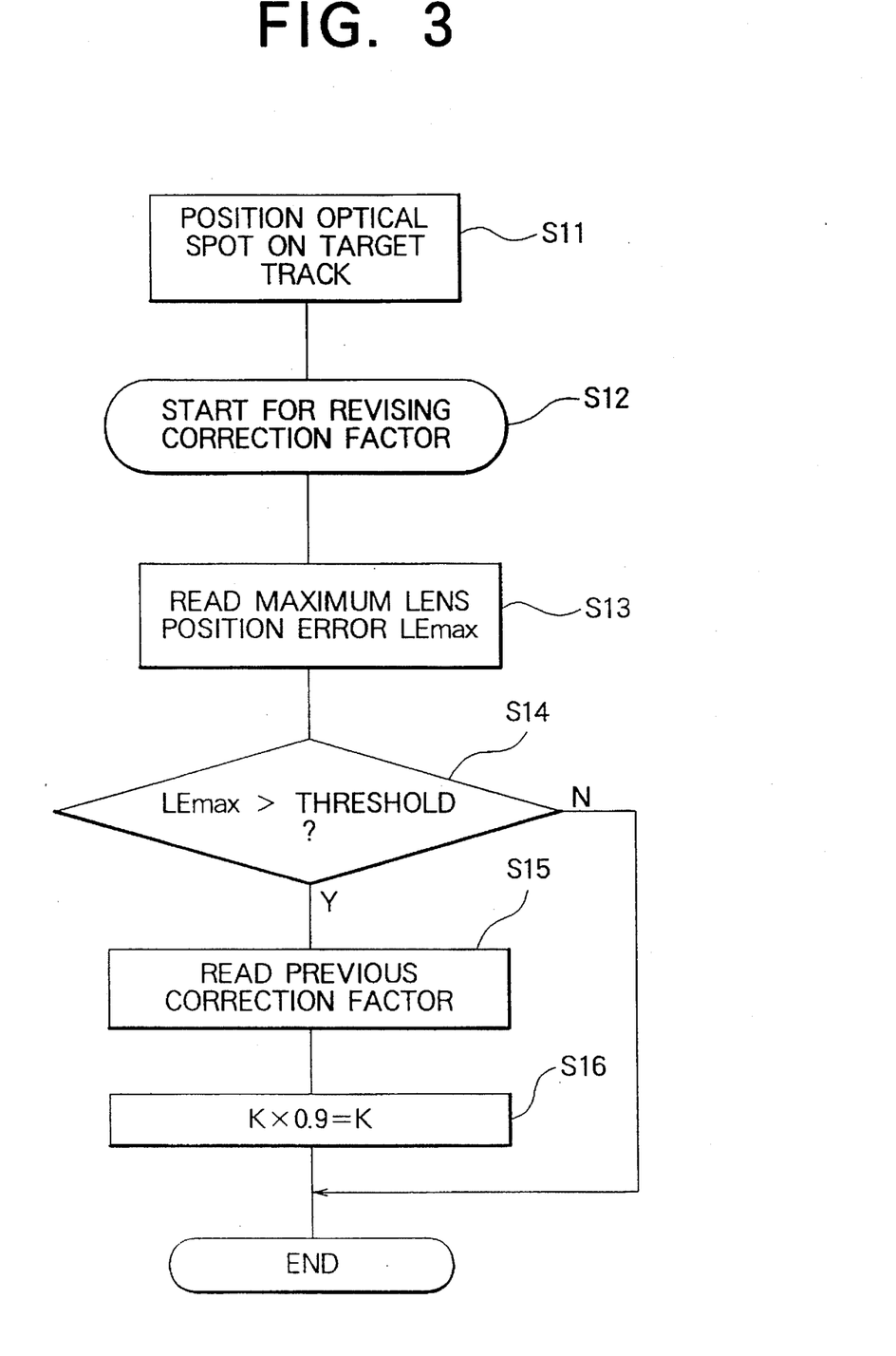
FIG. 3 is a flowchart showing a first example of calculation process for a correction factor.

In FIG. 3 showing the first example, after the previous seeking operation is completed (step S11), the DSP 13 starts for revising the correction factor for calculating a speed profile of the optical spot (step S12). The DSP first reads out the maximum lens position error $LE_{max}$ stored in the memory during the previous seeking operation (step S13), then compares the same with a predetermined threshold in the tracking system (step S14). If $LE_{max}$ is larger than the threshold, the DSP 13 reads out correction factor K used in the previous seeking operation (step S15), and multiplies the correction factor K by a first constant smaller than one, for example 0.9, so as to obtain a new correction factor K=0.9×K (step S16), thereby updating the correction factor K in the memory to end the process for revising the correction factor (step S17). If $LE_{max}$ is smaller than the threshold in step S14, the updating is not executed to end the process. If the new correction factor K smaller than the previous correction factor is used, the seek speed of the optical spot is reduced as compared to that of the previous seeking operation for avoiding a large lens position error exceeding the threshold.

Figure 4:
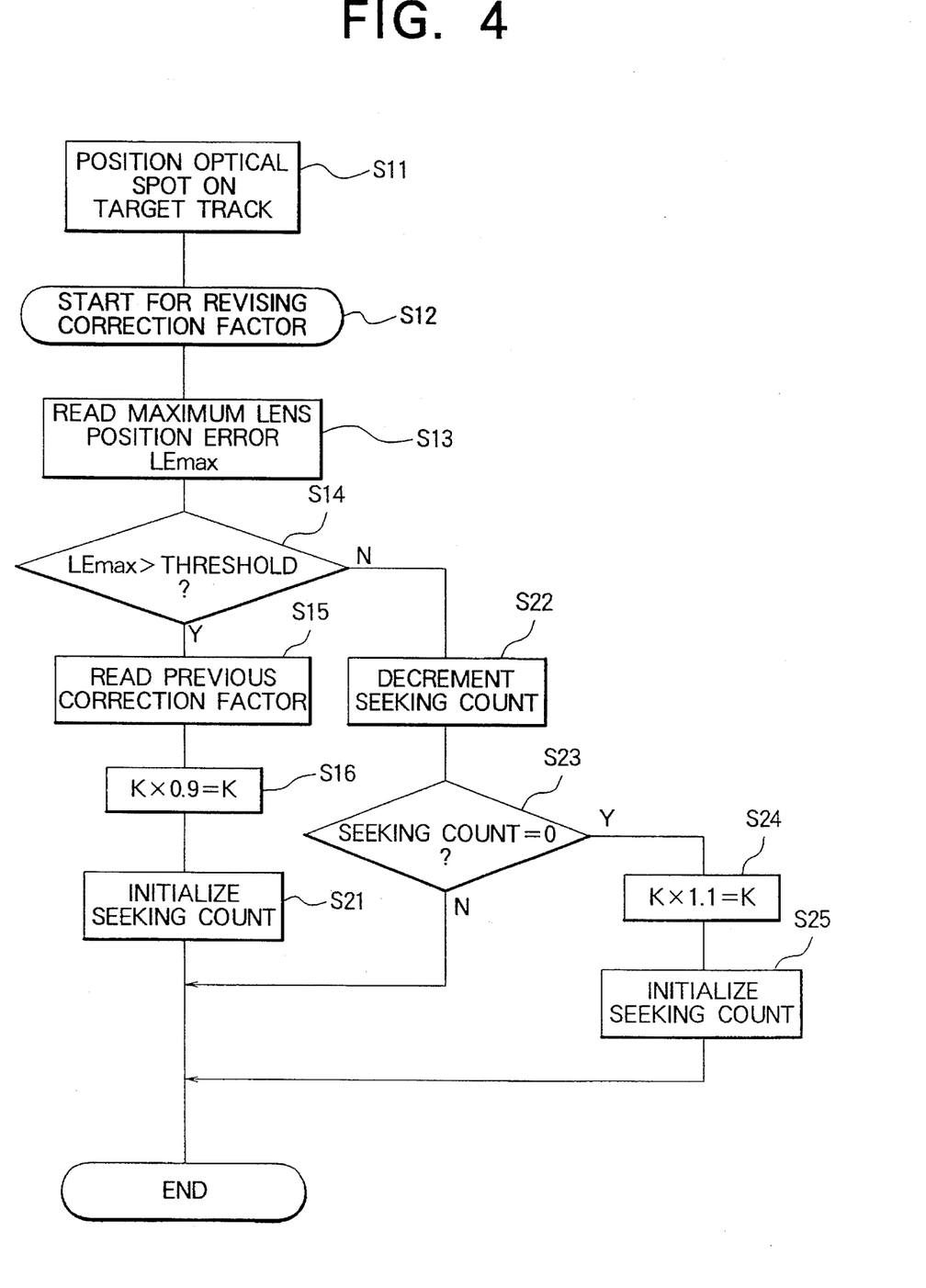
FIG. 4 is a flowchart showing a second example of calculation process for a correction factor.

In FIG. 4 showing a second example, the steps similar to the steps in FIG. 3 are designated by the same reference characters as those in FIG. 3 and the description of the similar steps are not made here for avoiding a duplication. In FIG. 4, if it is judged in step S14 that the maximum lens position error $LE_{max}$ is larger than the threshold, the correction factor K is updated by a new, smaller correction factor, similarly to the first example. On the other hand, if $LE_{max}$ is smaller than the threshold in step S14, a seeking count stored in the DSP 13 for counting the number of seeking operations in which the $LE_{max}$ is smaller than the threshold is decremented (step S22), then the seeking count is examined whether it is equal to zero (step S23). If the seeking count is more than zero, the correction factor K is not updated to end the revising process (step S26).

If the seeking count is equal to zero in step S23, the previous correction factor K is read out from the memory and multiplied by a second constant larger than one, for example, 1.1. The correction factor K in the memory is replaced by a new, larger correction factor 1.1·K for updating thereof (step S24), then the seeking count is initialized (step S25) to end the revising process (step S26). The seeking count is also initialized in step S21 after the correction factor is replaced by 0.9·K in step S16. The new larger correction factor 1.1·K is used in the following seeking operation to increase the seek speed of the optical spot.

In the second example, as described above, if the maximum lens position error $LE_{max}$ does not exceed the threshold during the predetermined number of successive seeking operations, the correction factor is increased so that the speed of the optical spot can be increased even the maximum speed for the actuators in spite of fluctuation factors such as inclination of the optical head, vibration of the focusing lens and fluctuation of the supply voltage.

Figure 5:
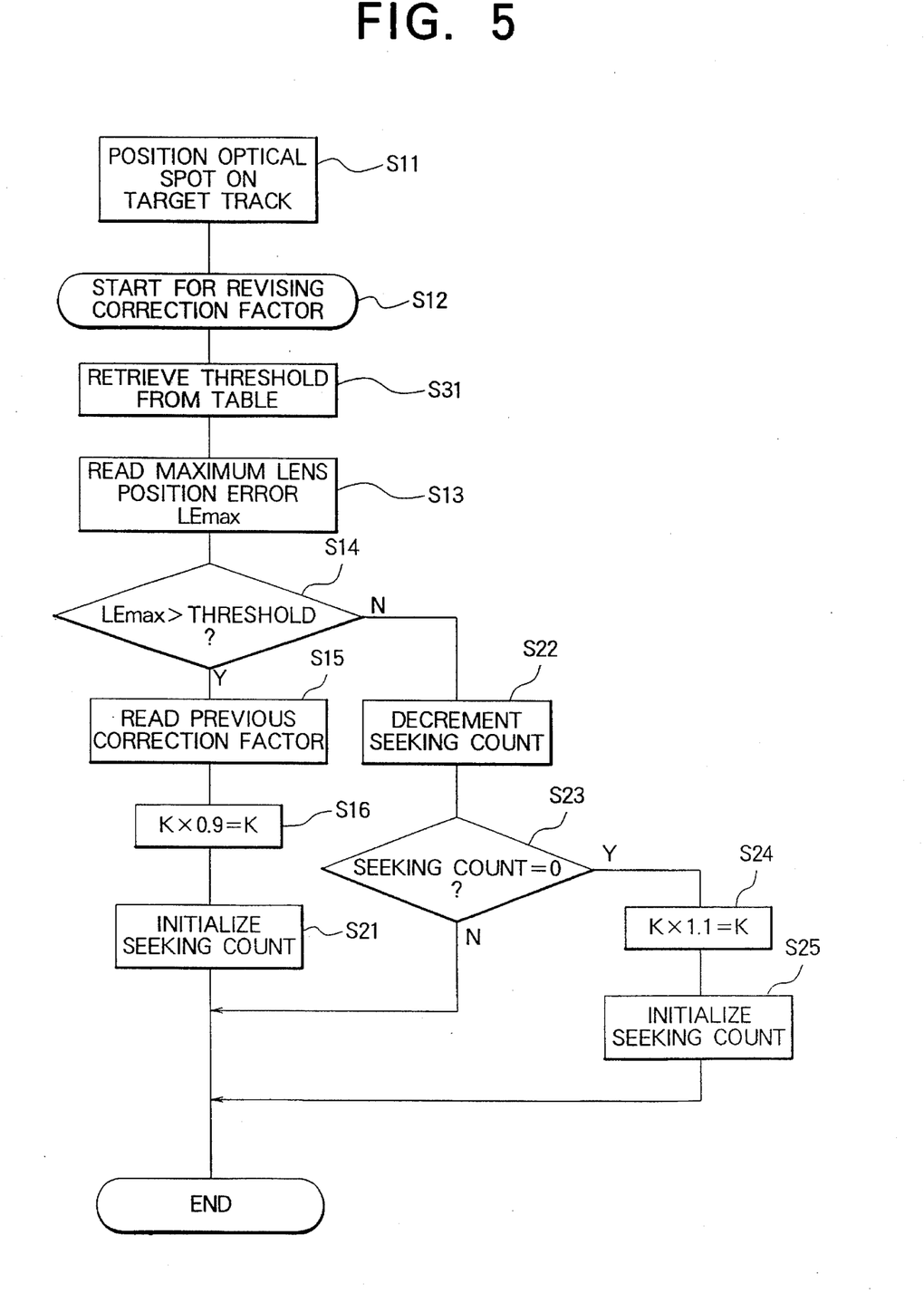
FIG. 5 is a flowchart showing a third example of calculation process for a correction factor.

In FIG. 5 showing a third example, the steps similar to those in FIGS. 3 and 4 are designated by the same reference characters as those in FIGS. 3 and 4, and the description of those steps in FIG. 5 will not be made here for avoiding a duplication. In short, the threshold for the maximum lens position error is selected in the third embodiment based on the seeking stroke.

In detail, after the start of the revising operation of the correction factor (step S12), a threshold for the specified seeking stroke is obtained from the memory by, for example, look-up of a threshold-seeking stroke table (S31). The retrieved threshold is used in the subsequent steps for determining whether the maximum lens position error is larger than the retrieved threshold (step S13). Other steps are similar to those in steps in FIG. 4. By these operations, the threshold can be determined at several levels based on the magnitude of the seeking stroke. A larger stroke provides a smaller threshold in the present example. If large seeking strokes occur, in the first and second examples, for successive seeking operation, the correction factor K may deviate from an optimal value, which is avoided in the third example by employing an optimal threshold for a specified seeking stroke.

Figure 6A:
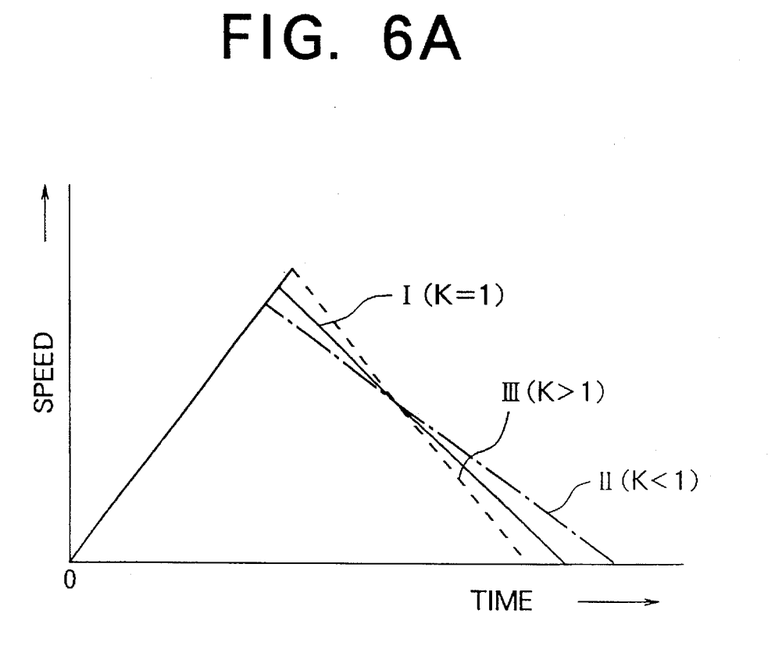
FIG. 6A is a graph showing time charts of a normalized speed profile and corrected seeking speed profile of the optical spot.
Figure 6B:
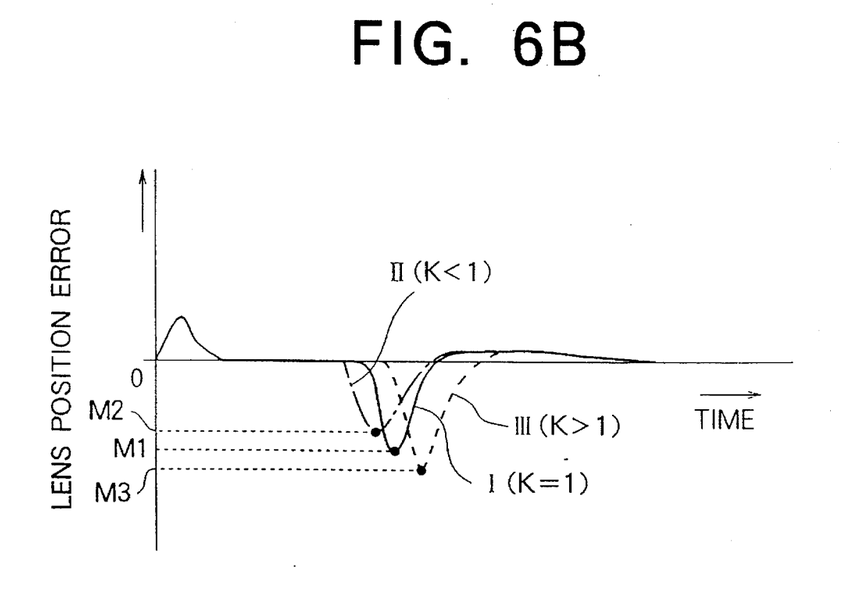
FIG. 6B is a graph showing time charts of lens position errors.

FIG. 6A shows normalized speed profile and corrected speed profiles for showing the speed profile of the optical spot while FIG. 6B shows time charts of the lens position error signals, both the figures being obtained by the embodiment of FIG. 1 in accordance with the process for revising the normalized speed profile. In FIG. 6A, the normalized speed profile I (or speed profile corrected by a correction factor K=1) is shown by a solid line, a first corrected speed profile II obtained by a correction factor K<1 is shown by a chain line, and a second corrected speed profile III obtained by a correction factor k>1 is shown by a dotted line. In FIG. 6B, the solid, broken and chain curves correspond to the solid, broken and chain lines, respectively, in FIG. 6A.

The normalized speed profile I (or K=1) includes a first profile section in which the speed is increased with a constant acceleration and a second profile section in which the speed is decreased with a constant deceleration. Generally, the second profile section is determined by estimating the stroke left, in the deceleration period and the present speed of the optical spot so as to obtain a zero speed upon arriving at the target track. The first profile section is determined based on the constant acceleration, the time period of the second profile section and the deceleration thereof.

The first corrected speed profile II is obtained by multiplying the constant deceleration in the normalized speed profile I by a correction factor K (K<1), and includes a first profile section smaller than the first profile section of the normalized speed profile I and a second profile section larger than the second profile section of the normalized speed profile i. The second corrected speed profile III is obtained by multiplying the constant deceleration in the normalized profile by a correction factor K (K>1), and includes a first profile section, which includes a first portion overlapping the first profile section of the normalized speed profile and a second portion having a higher speed, and a second profile section having a higher deceleration, so as to obtain a reduced seek time.

In FIG. 6B, the lens position error rises from zero at the start of the optical spot, falls zero after the optical head follows the focusing lens, Falls below zero after the profile shifts into a deceleration period, rises above zero after the optical head follows and exceeds the focusing lens, and finally falls zero when the optical spot arrives at the target track.

After one seeking operation is completed in which the normalized speed profile I, for example, is used, the maximum lens position error M1 (absolute value) is compared with a threshold. If the maximum lens position error M1 is larger than the threshold, a small correction factor K (K=0.9, for example) is employed to reduce the speed of the optical spot, in the following seeking operation, thereby obtaining the speed profile shown by the chain line II in FIG. 6A and a small maximum position error M2 in FIG. 6B.

On the other hand, if the maximum lens position error M1 is smaller than the threshold, in the second or third example, during the predetermined number of seeking operations, a large correction factor K (K=1.1, for example) is employed to raise the speed of the optical spot in the following seeking operation, thereby obtaining the speed profile shown by the broken line III in FIG. 6A and a larger maximum lens position error H3 in FIG. 6B. The smaller and larger maximum lens position error will be compared with the threshold in the following step and will converge to a suitable value after a large number of seeking operations.

The correction factor K can be of any magnitude obtained by powers of constants so long as the lens position error signal remains at a suitable magnitude. Accordingly, the speed of the optical spot is raised to the critical speed obtainable by the actuators while maintaining the stable seeking operation in spite of the inclination of the optical head, vibration of the focusing lens or the fluctuation of the supply voltage.

For a larger correction factor K or for a larger seeking stroke, the corrected speed profile in FIG. 6A may have a third profile section between the first profile section and the second profile section, the third profile section being a constant speed period, which may be the maximum speed obtainable by the tracking system.

The present invention can be applied not only to a read-only optical disk, but also a rewritable disk such as a magneto-optical disk and a phase shift optical disk.

Since above embodiments are described only for examples, the present invention is not limited to such embodiments and it will be obvious for those skilled in the art that various modifications or alterations can be easily made based on the above embodiments within the scope of the present invention.

For example, the maximum lens position error $LE_{max}$ is used for representing the lens position error for an exemplification purpose. However, the lens position error is not limited thereto for comparison with the threshold, and the mean value of the lens position error may be used for this purpose. Similarly, the first profile section and the second profile section having a constant acceleration and a constant deceleration, respectively, are also shown for exemplification purpose.

What is claimed is:

1. A head tracking system for an optical disk drive comprising:

an optical head mounting thereon a focusing lens for generating an optical spot on an optical disk;

a lens position error sensor for detecting a lens position error representing deviation of said focusing lens with respect to a reference position of said optical head;

a first means for generating a normalized speed profile;

a second means for calculating a correction factor based on the magnitude of said lens position error during a first seeking operation;

a third means for correcting said normalized speed profile based on said correction factor obtained during the first seeking operation to generate a corrected speed profile for a second seeking operation following the first seeking operation;

a first actuator for moving said focusing lens relative to said optical head in a radial direction of the optical disk based on said corrected speed profile; and a second actuator for moving said optical head relative to the optical disk in the radial direction based on the lens position error.

2. A head tracking system as defined in claim 1 wherein said first means includes a memory storing a normalized speed profile table listing normalized speed profiles in association with seeking strokes.

3. A head tracking system as defined in claim 1 wherein said normalized speed profile includes a first profile section for accelerating a speed with a constant acceleration and a second profile section for decelerating a speed with a constant deceleration.

4. A head tracking system as defined in claim 3 wherein said third means generates said corrected speed profile by multiplying said constant deceleration by said correction factor.

5. A head tracking system as defined in claim 1 wherein said second means calculates said correction factor based on a maximum lens position error during the first seeking operation.

6. A head tracking system as defined in claim 5 wherein said correction factor is smaller than one when said maximum lens position error during the first seeking operation is larger than a threshold.

7. A head tracking system as defined in claim 6 wherein said correction factor is larger than one when said maximum lens position error is smaller than said threshold for a predetermined number of the first seeing operations.

8. A head tracking system as defined in claim 6 wherein said threshold is determined based on the seeking stroke during the second seeking operation.

9. A head tracking system as defined in claim 6 wherein said correction factor is obtained by multiplying a first correction factor obtained in the first seeking operation by a second correction factor obtained in a third seeking operation preceding the first seeking operation.

* * * * *